3,286,002
PREPARATION OF ORGANOPHOSPHORUS S-BENZYLTHIOALKYLAMINE DERIVATIVES AND THEIR DEBENZYLATION PRODUCTS
George G. Curtis, Elizabeth, and Bernard Buchner, Westfield, N.J., assignors, by mesne assignments, to Continental Oil Company, a corporation of Delaware
No Drawing. Filed June 7, 1963, Ser. No. 286,195
4 Claims. (Cl. 260—947)

By reacting beta-mercaptoalkylamines, such as beta-mercaptoethylamine, with monosubstituted phosphorodichloridothionates, organophosphorus bis-sulfhydryl compounds can be prepared. These bis-sulfhydryl compounds have two open chains. We have found, that if the mono-substituent of the phosphorodichloridothionates is e.g. an alkyl or an O-alkyl radical, or an aryl or O-aryl radical, instead of the open chain bis-sulfhydryl compounds, closed ring compounds are formed of the type of monosubstituted 2 - thiono, 1,3,2 - thioamidophospholanes. With other mono-substituents, like with primary amine substituted phosphorodichloridothionates, mixtures of open chain bis-sulfhydryl compounds and of closed ring compounds of the thioamidophospholane type are formed.

One of the objects of this invention is to form open chain bis-sulfhydryl compounds free of closed ring impurities from monosubstituted phosphorodichloridothionates.

Another object of this invention is to form from monosubstituted phosphorodichloridothionates open chain addition compounds with S-benzylthioalkylamines, like with S-benzylthioethylamine. Another object of this invention is to debenzylate the said addition compounds in order to form the open chain bis-sulfhydryl compounds.

Other objects will be seen from the description below. As it will be shown, other phosphorus compounds can undergo the reaction of this invention as well as monosubstituted phosphorodichloridothionates.

The S-benzylthioalkylamines are illustrated by S-benzylethylamine. This is prepared by reacting benzyl-mercaptan with ethylenimine. S-benzylthiopropylamine can be prepared by reacting benzyl-mercaptan with propylenimine. We prefer to use S-benzylthioethylamine as a reactant for the purposes of this invention. The S-benzylthioethylamine addition compounds are themselves useful for many purposes. If they are used to prepare open chain sulfhydryl compounds the benzyl radical acts as a block and prevents the formation of closed ring compounds. In a subsequent step of forming poly-sulfhydryl compounds, such as bis-sulfhydryl compounds, the benzyl radicals are removed by debenzylation.

In one embodiment of this invention at least two mols of S-benzylthioethylamine are reacted with each atom of phosphorus of the molecule of the phosphorus compounds. In some cases three mols of S-benzylthioalkylamine are reacted. All of the phosphorus compounds of this invention contain the grouping:

The phosphorus compounds contain at least one pentavalent phosphorus atom. Two of these valencies are bonded to X, which is either oxygen or sulfur or nitrogen. The phosphorus compound reactants of this invention are members of the following class:

(1) $P_2S_5$
(2) $PSCl_3$
(3) $POCl_3$
(4) $RP(S)Cl_2$
(5) $ROP(S)Cl_2$
(6) $RSP(S)Cl_2$
(7) $RP(O)Cl_2$
(8) $ROP(O)Cl_2$
(9) $R_2NP(O)Cl_2$
(10) $R_2NP(S)Cl_2$
(11) $RNHP(O)Cl_2$
(12) $RNHP(S)Cl_2$
(13) $(PNCl_2)_3$
(14) $(PNCl_2)_4$

In all the above classes of compounds R is a hydrocarbyl radical which is a member of the class of alkyl, aryl, alkaryl, aralkyl and alicyclic radicals. The hydrocarbyl radicals may be substituted. Alkoxy groups, nitro groups and halogen atoms are suitable substituents.

Some of the classes of the phosphorus compound reactants are illustrated below:

CLASS (4): $RP(S)Cl_2$

Ethyl phosphonodichloridothionate
Propyl phosphonodichloridothionate
Butyl phosphonodichloridothionate
Phenyl phosphonodichloridothionate CLASS (5): $ROP(S)Cl_2$ O-methyl phosphorodichloridothionate
O-ethyl phosphorodichloridothionate
O-propyl phosphorodichloridothionate
O-i-propyl phosphorodichloridothionate
O-butyl phosphorodichloridothionate
O-amyl phosphorodichloridothionate
O-allyl phosphorodichloridothionate
O-decyl phosphorodichloridothionate
O-cetyl phosphorodichloridothionate
O-(2-methoxyethyl) phosphorodichloridothionate
O-phenyl phosphorodichloridothionate
O-(2-chloroethyl) phosphorodichloridothionate
O-(4-nitrophenyl) phosphorodichloridothionate
O-(2-naphthyl) phosphorodichloridothionate
O-(4-chlorophenyl) phosphorodichloridothionate
O-(2,4,6-trichlorophenyl) phosphorodichloridothionate
O-(4-nitro-2-chlorophenyl) phosphorodichloridothionate
O-(2,4-dichlorophenyl) phosphorodichloridothionate CLASS (6): $RSP(S)Cl_2$ S-ethyl phosphorodichloridothionate $C_2H_5S—P(S)Cl_2$ CLASS (7): $RP(O)Cl_2$ Vinyl phosphonic dichloride, $CH_2=CHP(O)Cl_2$,
Methyl phosphonic dichloride, $CH_3—P(O)Cl_2$,
Ethyl phosphonic dichloride, $C_2H_5—P(O)Cl_2$,
Chloroethyl phosphonic dichloride,
$Cl—CH_2—CH_2—P(O)Cl_2$
Bromoethyl phosphonic dichloride,
$Br—CH_2—CH_2—P(O)Cl_2$
n-Propyl phosphonic dichloride, $C_3H_7—P(O)Cl_2$,
i-Propyl phosphonic dichloride, $i-C_3H_7—P(O)Cl_2$,
i-Butyl phosphonic dichloride, $i-C_4H_7—P(O)Cl_2$,
i-Amyl phosphonic dichloride, $i-C_5H_9—P(O)Cl_2$,
Phenyl phosphonic dichloride, $C_6H_5—P(O)Cl_2$,
4-chlorophenyl phosphonic dichloride,
$4-Cl—C_6H_4—P(O)Cl_2$ CLASS (8): $ROP(O)Cl_2$, (O-HYDROCARBYL DICHLOROPHOSPHATES)

O-ethyl phosphorodichloridate,
O-methyl phosphorodichloridate,
O-(2-chloroethyl) phosphorodichloridate,
O-butyl phosphorodichloridate,
O-phenyl phosphorodichloridate,
O-(2-chlorophenyl) phosphorodichloridate,
O-(2-methylphenyl) phosphorodichloridate,

CLASS (9): $R_2NP(O)Cl_2$

N,N-diethyl phosphoroamidic dichloride
N,N-dimethyl phosphoroamidic dichloride
N,N-dipropyl phosphoroamidic dichloride
N,N-i-dibutyl phosphoroamidic dichloride
N,N-diphenyl phosphoroamidic dichloride

CLASS (10): $R_2NP(S)Cl_2$

N,N-dimethyl phosphoramidothioic dichloride
N,N-diethyl phosphoramidothioic dichloride
N,N-dipropyl phosphoramidothioic dichloride
N,N-dibutyl phosphoramidothioic dichloride
N-methyl, N-phenyl phosphoramidothioic dichloride
N-methyl, N(4-methylphenyl) phosphoramidothioic dichloride

CLASS (11): $RNHP(O)Cl_2$

N-ethyl phosphoroamidic dichloride
N-methyl phosphoroamidic dichloride
N-propyl phosphoroamidic dichloride
N-amyl phosphoroamidic dichloride
N-phenyl phosphoroamidic dichloride

CLASS (12): $RNHP(S)Cl_2$

N-methyl phosphoramidothionic dichloride
N-ethyl phosphoramidothioic dichloride
N-propyl phosphoramidothioic dichloride
N-i-propyl phosphoramidothioic dichloride
N-i-butyl phosphoramidothioic dichloride
N-amyl phoshoramidothioic dichloride
N-(3-methoxypropyl) phosphoramidothioic dichloride
N-cyclohexyl phosphoramidothioic dichloride
N-benzyl phosphoramidothioic dichloride The debenzylation of the blocked sulfhydryl compounds can be carried out by any suitable de-arylation or debenzylation method. We prefer to carry out the debenzylation in liquid ammonia with metallic sodium, as illustrated below in the examples.

In the preparation of the addition products of S-benzylethylamine there are no critical temperature limits. However, the presence of an inert solvent is preferred. The presence of an acid acceptor is preferred when the phosphorus compound reacting with the S-benzylalkylamine contains a halogen atom in the molecule. Benzene, toluene, petroleum ether, hexane, chloroform, tetrahydrofuran, ethylene chloride are illustrations of suitable inert solvents. The boiling point of these solvents range up to about 111° C. However, solvents with higher boiling points are also suitable. Suitable acid acceptors are for instance: triethylamine, pyridine, N-ethylmorpholine. A proper excess of the S-benzylthioethylamine may also be used as an acid acceptor. In this step of the process water may be present in the reaction mixture in many cases.

As mentioned, in the preparation of the addition products of S-benzylalkylamines there are no critical temperature limits. As illustrated in the examples, suitable temperatures range from about −10° C. to about the boiling point of the inert solvent present. It is preferred to start in most cases the reaction at low temperatures and to complete it at e.g.: 45° C., or 50° C., or 80° C. In some cases refluxing temperatures may be used for completion of the reaction. The debenzylation, if carried out in the presence of liquid ammonia, requires proper cooling until evaporation of the ammonia becomes desirable.

The examples here below illustrate the process and products of this invention without limiting the scope thereof. For illustration purposes S-benzylthioethylamine is used as illustrating the S-benzylthioalkylamine reactant.

*Example A.—Preparation of S-benzylthioethylamine*

THE REACTION EQUATION

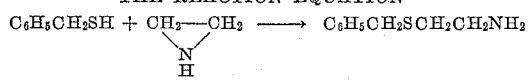

A solution of 9.6 grams (0.223 mol) of ethylenimine in 80 ml. of absolute ethanol was added dropwise to a stirred solution of 25 grams (0.201 mol) of benzylmercaptan in 400 ml. of absolute ethanol. The mixture was heated to reflux for 5 hours. Excess solvent was removed under reduced pressure and the material which distilled between 91–93° C. at 0.35 mm. was obtained in 94% yield and identified by its refractive index ($N_D^{25}$), 1.5750.

*Example 1.—N,N'-bis(S-benzylthioethyl) phosphorodiamidodithioic acid*

210.0 grams (1.26 mols) of S-benzylthioethylamine was added dropwise to a solution of 67.0 grams (0.3 mol) of phosphorus pentasulfide in 500 ml. of toluene while cooling the reaction mixture to about 40° C., under agitation. The reaction is exothermic and this is why cooling is required. After the addition was completed, the reaction mixture was heated to refluxing temperature and kept under reflux for 17 hours, whereupon the solvent was removed under vacuum. N,N'-bis(S-benzylthioethyl) phosphorodiamidodithioic acid:

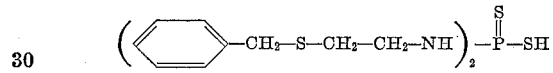

was recovered in 97.5% yield. The refractive index ($N_D^{20}$) was 1.6485.

*Example 2.—N,N'-bis(2-sulfhydroeythl) phosphorodiamidodithioic acid*

107.4 grams (0.25 mol) of N,N'-bis(S-benzylthioethyl) phosphorodiamidodithioic acid (dissolved in 50 ml. of toluene) was added dropwise simultaneously with small pieces of sodium to 500 ml. of liquid ammonia under stirring and cooling. Sodium was added repeatedly until a permanent blue color was obtained and the color maintained for two hours. Each time additional pieces of sodium were added when the color started to fade. When the reduction was complete, ammonium chloride was added until the blue color disappeared and then the ammonia was allowed to evaporate. With fast stirring 200 ml. of chloroform and 100 ml. of water were added at 5° C. to this residue, followed by the addition of as much of 15% hydrochloric acid as necessary to yield a pH of about 3. The organic layer was separated and the water layer extracted with 50 ml. of chloroform. The combined organic layers were washed with 200 ml. of 1% solution of sodium carbonate, followed by 200 ml. of distilled water and finally dried over anhydrous sodium sulfate. The drying agent was removed by filtration and the solvent was distilled under vacuum. The crude product was distilled under high vacuum in a molecular still. The product N,N'-bis(2-sulfhydroethyl) phosphorodiamidodithioic acid:

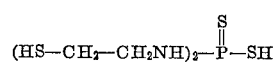

was recovered. The refractive index ($N_D^{20}$) was 1.6342. The product of this example is made from the product of Example 1.

*Example 3.—N,N',N''-tris(S-benzylthioethyl) phosphorotriamidothionate*

A solution of 84.7 grams (0.5 mol) of thiophosphoryl chloride and 177.0 grams (1.75 mols) of triethylamine was first prepared in 2.5 liters of toluene and cooled to −10° C. A solution of 276.0 grams (1.65 mols) of S-benzylthioethylamine in 500 ml. of toluene was then added dropwise to the first mentioned solution under agitation and while maintaining the temperature at −10° C. After the addition was completed the reaction mixture was stirred for two hours at 45° C., whereupon the contents were cooled to room temperature and filtered. The filtrate was concentrated under vacuum to a volume of 1 liter; the concentrate was washed with 400 ml. of 2% hydrochloric acid, followed by 400 ml. of 2% sodium carbonate, and finally with 400 ml. of water. The organic layer was dried over anhydrous magnesium sulfate, filtered, and the remaining solvent was distilled under vacuum. The crude residue recrystallized from a mixture of toluene and low-boiling (B.P. 34°–54° C.) petroleum ether. The product N,N',N''-tris(S-benzylthioethyl) phosphorotriamidothionate:

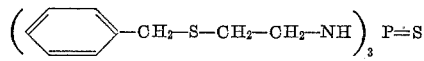

was recovered in 74% yield. The refractive index ($N_D^{20}$) was 1.6330 and the melting point was 47°–48.5° C.

*Example 4.—N,N',N''-tris(2-sulfhydroethyl) phosphorotriamidothionate*

A similar procedure was followed as described in Example 2. To 700 ml. of ammonia, under stirring and cooling, were added simultaneously 112.2 grams (0.2 mol) of N,N',N'' - tris(S-benzylthioethyl) phosphorotriamidothionate (product of Example 3) dissolved in 50 ml. of toluene dropwise and small pieces of sodium until a permanent blue color was obtained. The reaction mixture was processed as described in Example 2. The product, N,N',N''-tris(2-sulfhydroethyl) phosphorotriamidothionate:

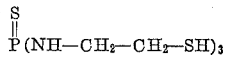

was recovered. The density ($d_4^{20}$) was 1.307, the refractive index ($N_D^{20}$) was 1.6280. The product of this example was made from the product of Example 3.

*Example 5.—N,N',N''-tris(S-benzylthioethyl) phosphorotriamidate*

A solution of 267.0 grams (1.6 mols) of S-benzylthioethylamine and 167.0 grams (1.65 mols) of triethylamine in 2.5 liters of toluene was first prepared and cooled to −5° C. A solution of 76.7 grams (0.5 mol) of phosphoryl chloride was then prepared in 1.2 liters of toluene and added dropwise under agitation to the first mentioned solution, while maintaining the temperature at −5° C. After the addition was completed the reaction mixture was stirred for two hours at 50° C., whereupon the contents were filtered, while hot. The filtrate was concentrated to 1 liter, placed in the refrigerator for one day and the solid product recovered by filtration. The crude material was recrystallized from hot toluene. The product N,N',N'' - tris(S-benzylthioethyl) phosphorotriamidate:

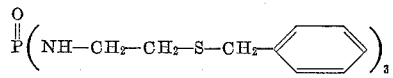

was recovered. The melting point was 76°–77° C. Example 15 shows the debenzylation of this product.

*Example 6.—N,N'-bis(S-benzylthioethyl) butylphosphonodiamidothionate*

A solution of 77.0 grams (0.46 mol) of S-benzylthioethylamine and 50.6 grams (0.5 mol) of triethylamine in 500 ml. of toluene was first prepared and cooled to 0° C. A solution of 40.1 grams (0.21 mol) of butyl phosphonodichloridothionate was then added to the first mentioned solution slowly and under agitation, while maintaining the temperature of 0° C. After the addition was completed, the reaction mixture was stirred for one hour at room temperature and for two hours at 45° C., whereupon the contents were cooled to 0° C. and filtered under suction. The filtrate was concentrated under vacuum to a volume of 200 ml.; the concentrate was washed with 100 ml. 2% HCl, followed by 100 ml. 2% $Na_2CO_3$, and finally with 100 ml. water. The organic layer was dried over anhydrous magnesium sulfate. After the drying agent was filtered, the remaining solvent was removed under vacuum and the crude residue recrystallized thrice from toluene and low boiling petroleum ether. The product had the following structural formula:

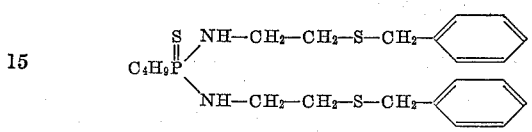

The melting point of this product was 50°–50.5° C.

*Example 7.—N,N'-bis(2-sulfhydroethyl) butylphosphonodiamidothionate*

80.1 grams (0.18 mol) of N,N'-bis(S-benzylthioethyl) butylphosphonodiamidothionate, dissolved in 50 ml. of toluene, was added dropwise simultaneously with small pieces of sodium to 400 ml. of liquid ammonia under stirring and cooling. The quantity of sodium was sufficient to cause a permanent blue color. This blue color was maintained for two hours with addition of further pieces of sodium each time when the color started to fade. When the reduction was complete, ammonium chloride was added until the blue color disappeared and then the ammonia was allowed to evaporate. To the residue 200 ml. of toluene and 100 ml. of water were added, while stirring and maintaining the mixture at the temperature of 5° C., followed by the addition of as much of 15% hydrochloric acid as required to yield a pH of about 3. The organic layer was separated and the water layer extracted with 50 ml. of toluene. The combined organic layers were washed with 200 ml. of 1% solution of sodium carbonate followed by 200 ml. of distilled water, and finally dried over anhydrous sodium sulfate. The drying agent was removed by filtration and the solvent was distilled under vacuum. The crude product was distilled under high vacuum in a molecular still. The product N,N' - bis(2 - sulfhydroethyl) butylphosphonodiamidothionate:

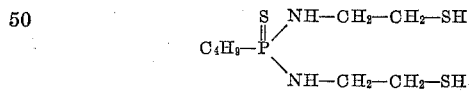

was recovered in 63% yield. The density ($d_4^{20}$) was 1.168 and the refractive index ($N_D^{20}$), 1.5820. The product of this example is made from the product of Example 6.

*Example 8.—O-ethyl, N,N'-bis(S-benzylthioethyl) phosphorodiamidothionate*

A solution of 71.8 grams (0.4 mol) of O-ethyl phosphorodichloridothionate in 300 ml. of toluene, was added slowly to a solution of 167.2 grams (1.0 mol) of S-benzylthioethylamine and 91.0 grams (0.9 mol) of triethylamine in 1.5 liters of toluene under stirring, at 0° C. After the addition was completed, the reaction mixture was stirred for two hours at 45° C., whereupon the contents were cooled to 0° C. and filtered under suction. The filtrate was concentrated under vacuum to a volume of 500 ml.; the concentrate was washed with 400 ml. of 2% hydrochloric acid followed by 400 ml. of 2% sodium carbonate, and finally with 400 ml. of water. The organic layer was dried over anhydrous magnesium sulfate, the drying agent removed by filtration, and the remaining solvent distilled under vacuum. The crude material was purified by a high vacuum distillation in a molecular still. The product O-ethyl N,N'-bis(S-benzylthioethyl) phosphorodiamidothionate:

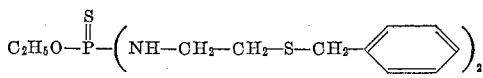

was recovered in 70 yield. The density ($d_4^{20}$) was 1.179 and the refractive index ($N_D^{20}$), 1.6029.

*Example 9.—O-ethyl, N,N'-bis(2-sulfhydroethyl) phosphorodiamidothionate*

In a similar procedure as described in Example 7, 88.1 grams (0.2 mol) of O-ethyl, N,N'-bis(S-benzylthioethyl) phosphorodiamidothionate, dissolved in 50 ml. of toluene was added dropwise simultaneously with pieces of sodium to 500 ml. of liquid ammonia under agitation and cooling. Sodium was added until a permanent blue color was obtained. The reaction mixture was further processed as described in Example 7. The product, O-ethyl, N,N'-bis(2-sulfhydroethyl) phosphorodiamidothionate:

was recovered in 64% yield. The density ($d_4^{20}$) was 1.227, and the refractive index ($N_D^{20}$), 1.5730. The product of this example is made from the product of Example 8.

*Example 10.—N,N-dimethyl, N',N''-bis(S-benzylthioethyl) phosphorotriamidate*

A solution of 89.0 grams dimethylaminophosphoryl dichloride in 500 ml. of toluene was added slowly under stirring to a solution of 176.0 grams (1.05 mols) of S-benzylthioethylamine and 112.0 grams (1.1 mols) of triethylamine in 1500 ml. of toluene at a temperature of 0° C. The reaction mixture was processed as described in Example 6. The product N,N-dimethyl, N',N''-bis(S-benzylthioethyl) phosphorotriamidate:

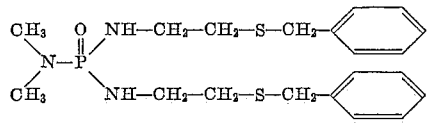

was recovered. The refractive index ($N_D^{20}$) was 1.5900, and the melting point, 46°–47.5° C.

*Example 11.—N,N-dimethyl, N',N''-bis(2-sulfhydroethyl) phosphorotriamidate*

99.1 grams (0.24 mol) of N,N-dimethyl, N',N''-bis(S-benzylthioethyl) phosphorotriamidate (product of Example 10) dissolved in 50 ml. of toluene was added dropwise simultaneously with small pieces of sodium to 600 ml. of liquid ammonia under stirring and cooling. The addition of small pieces of sodium was continued until a permanent blue color was obtained. The reaction mixture was processed as described in Example 2. The product, N,N - dimethyl, N',N'' - bis(2 - sulfhydroethyl) phosphoroamidate:

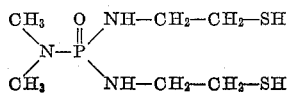

was recovered in 80% yield. The density ($d_4^{20}$) was 1.233, and the refractive index ($N_D^{20}$), 1.5548. The product of this example is made from the product of Example 10.

*Example 12.—Hexakis-N(S-benzylthioethyl) triphosphonitrilate*

A solution of 34.8 grams (0.1 mol) of phosphonitrilic chloride trimer, dissolved in 400 ml. of toluene was added slowly under stirring to a solution of 120.5 grams (0.72 mol) of S-benzylthioethylamine and 76.0 grams (0.75 mol) of triethylamine dissolved in 600 ml. of toluene, kept at 0° C. After the addition was completed, the reaction mixture was heated to 80° C. for two hours, whereupon the contents were cooled to 0° C. and filtered under suction. The filtrate was concentrated under vacuum to a volume of 400 ml., the concentrate was washed with 300 ml. of 2.0% sodium carbonate, and finally with 300 ml. of water. The organic layer was dried over anhydrous magnesium sulfate, the drying agent removed by filtration, and the remaining solvent distilled under vacuum. The crude product hexakis N-(S-benzylthioethyl) triphosphonitrilate:

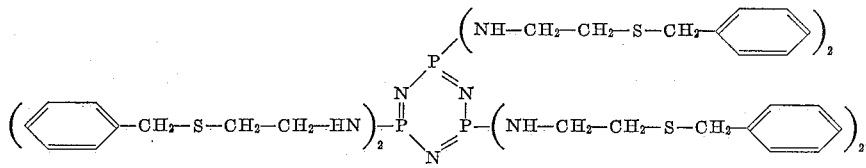

was recovered in 94% yield. The refractive index ($N_D^{20}$) was 1.6295.

*Example 13.—Hexakis-N(2-sulfhydroethyl) triphosphonitrilate*

91.0 grams (0.08 mol) of hexakis N-(S-benzylthioethyl) triphosphonitrilate (product of Example 12), dissolved in 50 ml. of toluene was added dropwise, simultaneously with small pieces of sodium to 500 ml. of liquid ammonia under stirring and cooling. The addition of the pieces of sodium was continued until a permanent blue color was obtained. The reaction mixture was processed as described in Example 2 (except that the product was not distilled). The product, hexakis N-(2-sulfhydroethyl) triphosphonitrilate:

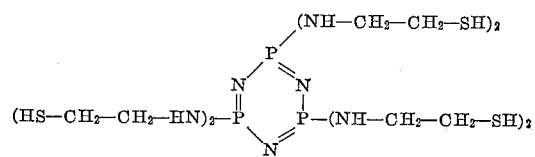

was recovered as an oil. The refractive index ($N_D^{20}$) was 1.6083. The product of this example is made from the product of Example 12.

*Example 14.—Octakis-N-(S-benzylthioethyl) tetraphosphonitrilate*

A solution of 46.3 grams (0.1 mol) of phosphonitrilic chloride tetramer dissolved in 500 ml. of toluene was added slowly under stirring to a solution of 154.0 grams (0.92 mol) of S-benzylthioethylamine and 101.2 grams (1.0 mol) of triethylamine in 700 ml. of toluene, kept at the temperature of 0° C. After the addition was completed, the reaction mixture was heated to 80° C. for two hours, whereupon the reaction mixture was processed as described in Example 12. The thick oily product solidified on standing, having a melting range of 74.5°–

78° C. The product octakis N-(S-benzylthioethyl) tetraphosphonitrilate:

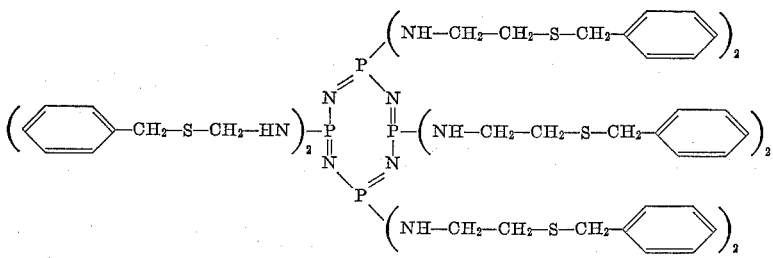

was recovered in 96% yield. After successful debenzylation this compound yields the free sulfhydryl product.

*Example 15.—N,N',N''-tris(2-sulfhydroethyl) phosphorotriamidate*

To 700 ml. of liquid ammonia under stirring and cooling, were added simultaneously 109.0 grams (0.51 mol) of N,N',N''-tris (S-benzylthioethyl) phosphorotriamidate (product of Example 5) in small increments and small pieces of sodium, until a permanent blue color was obtained. The reaction mixture was processed as described in Example 2. The product, N,N',N''-tris(2-sulfhydroethyl) phosphorotriamidate:

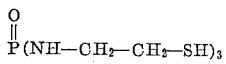

was recovered. The refractive index ($N_D^{20}$) was 1.5877.

The products of this invention, having N-(2-sulfhydroalkyl) open chains, are suitable as antioxidants in rubber, synthetic polymers, plastics, fatty oils, mineral oils, amongst others, and can be used as paint, varnish and resin additives to prevent aging by oxidation. They also act as stabilizers for polymeric plastics, like polyvinylchloride. They act as intermediates in other reactions, like acylation or esterification reactions (like +benzoyl chloride and base), alkylation reactions (like +methyl iodide and sodium) and addition reactions (like +ethylenimine).

The products of this invention, containing the N-(S-benzylthioalkyl) radicals, have also several uses. They are intermediates for the preparation of the N-(2-sulfhydroalkyl) open chain compounds. In many instances they act as antioxidants. Many of them have herbicidal and insecticidal activity. In a contact residual film test, e.g. insecticidal activity was found against confused flour beetle. In a Leaf and Larvae Dip Method against Mexican bean beetles, feeding of the larvae was greatly reduced with this type of compound. Many have fungicidal activity, when tested by the oat seed disinfection evaluation, where the oat seeds are heavily infected with *Helminthosporium avenae*.

N,N-diethyl, N',N''-bis(2-sulfhydroethyl) phosphorotriamidothionate is a related compound to the product of Example 11 and can be prepared by using in Example 10, N,N-diethyl phosphorodichloridothionate as reactant with the S-benzylthioethylamine and debenzylating the resulting compound in accordance with the conditions of Example 11. N,N-diethyl, N',N''-bis(2-sulfhydroethyl) phosphorotriamidothionate was tested as an insecticide against confused flour beetle (*Tribolium confusum*). The method was a contact residual film test. The chemical is prepared in acetone solution or as wettable powder in the proper concentration. It is deposited as 1 ml. of chemical dosage uniformly over a 9.6 cm. diameter Petri plate. The chemical is permitted then to dry to a thin film-like layer. Adult confused flour beetles, priorly starved for 24 hours, are then placed, 10 per plate, on duplicate test vessels. The Petri plates are closed during the observation. In 5 days' time 90% kill was observed and the remaining 10% was affected. In a control vessel none of the insects were affected or killed during the same period of observation. The same product showed some phytotoxic action in a seed germination screening test. Candidate chemicals in this test are pipetted in 5 cc. quantities onto filter paper contained within plastic Petri dishes. Seeds of the selected crops are then placed on the treated disks and observed for germination over a period of time. The number of seeds germinating and general observation on extent of root and cotyledon damage indicate herbicidal potential. At 2500 p.p.m. concentration flax germinated only to a degree of 50% and tomato to a degree of 24%. Observation was for a 7 day period. The control for flax showed 76% and for tomato 26% germination without damage. The plants, which germinated after treatment with this product showed distinct damage.

A post-emergent herbicidal test of screening nature was carried out with the products of Examples 1, 2, 3, 4, 5, 6, 8, 9, 10 and 11. Flats were prepared by seeding ahead of time of chemical application. On the day of application pigweed was 27 days old; crabgrass, radishes, ryegrass and crimson clover 23 days old; bush beans, oats and tomato transplants 19 days old. Flats were treated twice with Fermate during germination and early seedling stage to prevent "damping off" of pigweed, clover and beans. Products of Examples 3, 4, 6, 8, 9 and 10 were applied from 10% acetone solutions. Because of insolubility in acetone, the products of the other examples were applied as wettable powders; products of Examples 1, 2 and 11 at 6.67% concentration and the product of Example 5 at 10% concentration. All applications were at 19 pounds per acre for the active chemicals. Dicots were represented by bush beans, radishes, tomato, pigweed and crimson clover. Monocots were represented by oats, crabgrass and ryegrass.

The product of Example 1 [N,N'-bis(S-benzylthioethyl) phosphorodiamidothioic acid] was inactive on dicots and showed effect on oats of the monocots. The product of Example 2 [N,N'-bis(2-sulfhydroethyl) phosphorodiamidodithioic acid] showed similar results to the product of Example 1. The product of Example 3 [N,N',N''-tris(S-benzylthioethyl) phosphorotriamidothionate] showed some activity on bush bean and crimson clover; no activity on the monocots. The product of Example 4 [N,N',N''-tris(2-sulfhydroethyl) phosphorotriamidothionate] showed activity on bush bean, radishes and crimson clover, and was active on crabgrass, ryegrass and oats. The product of Example 4 was most active in this group. General degree of activity: moderate.

The product of Example 5 [N,N',N''-tris(S-benzylthioethyl) phosphorotriamidate] was inactive on the dicots and showed activity on ryegrass and oats. The product of Example 6 [N,N'-bis(S-benzylthioethyl) butylphosphonodiamidothionate] showed activity on radishes and crimson clover and lesser activity on bush beans and tomato. From the monocots, activity was shown on all three, most against oats. The product of Example 8 [O-ethyl, N,N'-bis(S-benzylthioethyl) phosphorodiamidothionate] showed activity on radishes, bush beans and crimson clover, in decreasing order. It also showed activity on monocots, least on ryegrass. The product of Example 9 [O-ethyl, N,N'-bis(2-sulfhydroethyl) phosphorodiamidothionate], showed the greatest degree of activity in this group. In decreasing degree, the activity was: pigweed (most), crimson clover, radish, bush bean. It also showed higher activity on monocots (highest in the groups reported to here) in the decreasing order of crabgrass (most), ryegrass and oats. General degree of activity: moderate.

The product of Example 10 [N,N-dimethyl, N',N''-bis(S-benzylthioethyl) phosphorotriamidate] showed the highest degree of activity in the entire group of 10 compounds tested in this set. In decreasing order the ratings were: pigweed (high), radishes and crimson clover (fairly high), bush bean and tomato. With the monocots the order was: crabgrass, ryegrass, oats. The product of Example 11 [N,N-dimethyl, N',N''-bis(2-sulfhydroethyl) phosphorotriamidate] showed modest activity on bush bean, and on monocots: on ryegrass and oats.

Best activity was obtained with the products of Examples 10 and 9, as outlined above. The product of Example 4 followed in order.

It should be noted that in herbicidal compositions, it is customary to prepare a "concentrate" of the active chemical. The concentrates are emulsions and in addition to the active chemical they contain solvents, surfaceactive agents (such as emulsifying agents), and water. The selection of the proper solvent and the proper surfaceactive agent is of great importance and can greatly enhance the herbicidal activity of a particular active compound when compared with results in screening tests.

We claim:

1. The method of producing phosphorus compounds containing in the molecule at least two open chain (2-sulfhydroalkyl) radicals reacting in the first step with a phosphorus compound at least two mols of an S-benzylthioalkylamine per phosphorus atom of said phosphorus compound, said compound containing at least one pentavalent phosphorus atom and the grouping:

wherein X is a member of the class consisting of oxygen, sulfur and nitrogen bonded with two valencies to one phosphorus atom, said phosphorus compound being a member of the class consisting of $P_2S_5$, $PSCl_3$, $POCl_3$, $RP(S)Cl_2$, $ROP(S)Cl_2$, $RSP(S)Cl_2$, $RP(O)Cl_2$
$ROP(O)Cl_2$, $R_2NP(O)Cl_2$, $R_2NP(S)Cl_2$, $RNHP(O)Cl_2$
$RNHP(S)Cl_2$, $(PNCl_2)_3$, and $(PNCl_2)_4$ the R being a hydrocarbyl radical and being a member of the class consisting of alkyl, aryl, alkaryl and aralkyl radicals, and in a subsequent step debenzylating the so formed compounds.

2. The process of claim 1, wherein debenzylation is carried out with the aid of liquid ammonia and an alkali metal.

3. The process of claim 1, wherein the debenzylation is carried out with the aid of liquid ammonia and metallic sodium.

4. O-ethyl, N,N'-bis(2-sulfhydroethyl) phosphorodiamidothionate.

References Cited by the Examiner
UNITED STATES PATENTS 2,852,550   9/1958   Godfrey _____ 260—461.106
3,035,080   5/1962   Arnold et al. ____ 260—461.106

OTHER REFERENCES

Chu, "J. Org. Chem.," 26, 4498–4501 (1961).
Ikehara, "Chem. Pharm. Bull. (Tokyo)," 8 (1960), 830–835.
Walton et al., "J. Am. Chem. Soc.," 76 (1954), 1146–1148.

CHARLES B. PARKER, *Primary Examiner.*

F. M. SIKORA, *Assistant Examiner.*